United States Patent [19]

Schara et al.

[11] 4,191,781

[45] Mar. 4, 1980

[54] PET FOOD FLAVOR

[75] Inventors: Robert E. Schara, Norwalk, Conn.; Larry E. Keenberg, Kankakee, Ill.; Andrew Makar, Yonkers, N.Y.

[73] Assignee: General Foods Corporation, White Plains, N.Y.

[21] Appl. No.: 838,411

[22] Filed: Sep. 30, 1977

[51] Int. Cl.$^2$ ................................................ A23K 1/00
[52] U.S. Cl. ...................................... 426/2; 426/548; 426/623; 426/630; 426/635; 426/641; 426/658; 426/805
[58] Field of Search ................... 426/2, 548, 805, 623, 426/630, 635, 641, 658; 536/4

[56] References Cited

U.S. PATENT DOCUMENTS

| 3,202,514 | 8/1965 | Burgess et al. | 426/532 |
|---|---|---|---|
| 3,282,706 | 11/1966 | Muller et al. | 426/538 |
| 3,883,672 | 5/1975 | Bone et al. | 426/805 |

Primary Examiner—R. B. Penland
Attorney, Agent, or Firm—Mitchell E. Alter; D. J. Donovan

[57] ABSTRACT

The palatability of dog foods is increased by incorporating therein effective amounts of ammoniated glycyrrhizin.

10 Claims, No Drawings

PET FOOD FLAVOR

BACKGROUND OF THE INVENTION

The present invention relates to a new dog food flavoring agent and more particularly to dog foods having increased palatability due to the use of this flavor and methods for producing the dog foods in increased palatability.

There is a continuing effort being made to increase the palatability of dog foods, while at the same time maintaining their nutritional value. While, by itself, the development of nutritious dog foods is quite well understood and poses few problems to the art, there is a continuing problem of making these formulations palatable. Where an offered food is unpalatable, a dog may pass it up and thereby not take advantage of its nutritional value.

Many attempts have been made to obtain increased palatability of pet foods by the addition of a variety of materials. For example, it has been suggested that licorice and licorice-type products may provide palatability increases in dog foods. Our tests with licorice indicate, however, that they are not accepted by dogs. Among the known licorice flavored materials is glycyrrhizin, as well as its ammoniated and acid forms. It is on the premise, wrongly according to our tests, that dogs like licorice that ammoniated glycyrrhizin has been suggested by its manufacturer for use in dog foods.

Ammoniated glycyrrhizin is perhaps the sweetest chemical processed commercially that is prepared from essentially natural sources, and has a sweetness value about 50 times greater than that of sucrose. Glycyrrhizic acid is obtained in about 90% or more purity by grinding the root glycyrrhiza glabra, extracting the ground material with hot water, and treating the extract to recover the acid insoluble fraction containing the glycyrrhizic acid. Glycyrrhizic acid can be ammoniated, to provide ammoniated glycyrrhizin, by replacing one or more of the three acid hydrogen ions with ammonium ions. Ammoniated glycyrrhizin, therefore, ranges from a mono-ammoniated product to an essentially fully (tri) ammoniated product and mixtures thereof.

It is primarily for the licorice flavor of ammoniated glycyrrhizin that it has found widespread use as a flavoring agent in, for example, confections. Because of the licorice flavor, however, ammoniated glycyrrhizin has not been widely used alone as a sweetening agent except in some licorice-flavored confections, since the amount required for sweetening also imparts the characteristic licorice flavor.

In U.S. Pat. No. 3,282,706, it was disclosed that ammoniated glycyrrhizin potentiates the sweetness of sucrose in sucrose-containing foods, confections and beverage at levels which do not appreciably impart the licorice flavor. By "potentiate" was meant that the sweetness value of a combination of sucrose and ammoniated glycyrrhizin was over and above the sum or mere additive effects of the known sweetness values and was, therefore, the result of synergism between sucrose and ammoniated glycyrrhizin in certain relative proportions of one to the other. The critical levels disclosed in that patent were from 0.2 to 2.2 parts by weight of ammoniated glycyrrhizin per one hunderd parts by weight of sucrose. Thus, this patent discloses that at levels of ammoniated glycyrrhizin below 2.2% (22,000 parts per million) based on the combined weight of sucrose and ammoniated glycyrrhizin, no licorice flavor was noticed and, at levels below 0.2% (2,000 parts per million) of ammoniated glycyrrhizin based on the combined weight of it with the sucrose, no synergism was noticed.

SUMMARY OF THE INVENTION

It is an object of the present invention to provide dog foods of improved palatability.

It is a further object of the present invention to provide a process for improving the palatability of dog foods.

These and other objects are accomplished according to the present invention by incorporating into a dog food an effective amount of ammoniated glycyrrhizin to thereby increase the palatability of the dog food.

DETAILED DESCRIPTION OF THE INVENTION

The term "palatability" is broad and encompasses all of the various properties of the food sensed by the dog. Among these properties are texture, taste and aroma. It is believed that the present invention increases the overall palatability of a dog food by improving the taste of the food through the introduction of a highly pronounced and desirable flavor note attractive to the dogs. The compound identified according to this invention may be referred to herein alternatively as a dog food flavor or a palatability enhancer.

The compound ammoniated glycyrrhizin identified according to this invention as a palatability enhancer for dogs can improve the attractiveness and acceptance by dogs of a variety of foods formulated for them. Among these foods are the dry, intermediate-moisture, and canned dog foods of conventional formulation; as well as soups or gravies for use in combination with the other dog food forms. Typical formulations of dry dog foods and their methods of preparation are those described in U.S. Pat. Nos. 3,119,691 to Ludington et al., 3,365,297 and 3,330,503. Typical of the intermediate-moisture dog foods are those described in U.S. Pat. No. 3,202,514 to Burgess et al. and United Kingdom Pat. No. 1,151,991 to Schara et al. The disclosure of all of these above-mentioned patents are hereby incorporated by reference. Especially suitable among the dog foods which can be improved by the dog food flavor or palatability enhancer identified according to the present invention are soups and gravy formers for dog use. These soups and gravies, or soup and gravy formers will comprise, when reconstituted with water, effective levels of the ammoniated glycyrrhizin of between about 25 to about 400 parts per million as is necessary to improve the palatability of the soup or gravy alone or as taken in combination with a food which is served with it. For gravies, a bland thickening medium will ordinarily be employed, and such thickeners can also be employed in soups. Among the suitable bland thickeners are those hydrophilic colloids, such as carboxymethylcellulose, sodium alginate, kelp derived gums, and the like, which are known in the art. The preferred foods are full feeding, nutritionally balanced dog foods containing protein, fat, carbohydrates, vitamins and minerals.

When employed with a solid dog food ot the types mentioned above, the dog food flavor composition of this invention can be thoroughly dispersed within or coated on the outside of the food. For dry foods it may be applied in a manner which allows its release into any water used for hydration. Where the dry dog food has an exterior fat coating, the flavor compound will typically be applied to the exterior of the fat coating. It can also be incorporated interiorally of the food, such as by simple mixing with the other ingredients during preparation.

The active taste compound identified by this invention is employed with the dog food in any amount which is effective for its flavor as such to be observed by the dog, and is desirably employed at a level effective to produce significant improvement in palatability for the dog food. Based on testing to date, it would appear that levels of from about 25 to about 400 parts per million should be effective in improving the palatability of the base dog foods.

In the case of dry dog foods containing no added sucrose, or amounts of sucrose up to 5% based on the weight of the food, amounts of ammoniated glycyrrhizin of about 100 parts per million produce a significant palatability improvement over foods not containing the ammoniated glycyrrhizin. The use of up to 5% sucrose with the ammoniated glycyrrhizin shows an added effect on palatability, but no synergism is noticed.

For intermediate-moisture dog foods, the amount of ammoniated glycyrrhizin employed will depend on the sucrose content of the dog food. The preferred amounts will in general be in accordance with the following table:

| Sucrose (Wt. %) | Ammoniated Glycyrrhizin (PPM) |
| --- | --- |
| 21-25 | 100-400 |
| 16-21 | 100-300 |
| 13-16 | 25-250 |
| 10-13 | 25-175 |
| 8-10 | 25-150 |
| 6-8 | 25-100 |
| 4-6 | 25-75 |
| 2-4 | 25 |

Variation from and within these ranges will obviously occur depending upon the particular dog food formulation and its processing history, as well as the manner of application of these flavors. It is presently believed, however, that levels much below those indicated will not be effective to any degree in providing the palatability improvement, and levels greatly above the indicated ranges will start to detract from the palatability of the food.

The dog foods containing ammoniated glycyrrhizin according to the present invention are fed to dogs in normal manner, except for the fact that they are treated at some point to incorporate the dog food flavors in effective amounts.

The following examples are presented for the purpose of further illustrating and explaining the present invention and are not to be taken as limiting in any regard. Unless otherwise indicated, all parts and percentages are by weight.

EXAMPLE I

A dry, kibbled dog food of commercial formulation having a 4% surface coating of bleachable fancy tallow was employed as a control and fed to dogs against the same dog food having the test materials indicated in Table I applied to the surface. The results are summarized in Table I.

TABLE I

| Test Material | Level (ppm) | Results |
| --- | --- | --- |
| B.B. Allan Licorice Flavor NA 6340 | 25 | No significant preferences or disagreement among dogs |
| JAD Licorice Captarome 17161 | 200 | Significant preference for control, even though there is significant disagreement among dogs |
| JAD Licorice Captarome 17161 | 400 | No significant preferences or disagreement among dogs |
| JAD Licorice Captarome 17161 | 1000 | No significant preferences or disagreement among dogs |
| Flavors Natural and Artificial Licorice No. 1238 | 25 | No significant preferences or disagreement among dogs |
| Dobson Licorice Powder | 50 | No significant difference over control |
| Dobson Licorice Powder | 400 | No significant difference over control |
| Flavors Natural and Artificial Licorice Flavor No. 1238 | 50 | No significant preferences or disagreement among dogs |
| Flavors Natural and Artificial Licorice Flavor No. 1238 | 100 | No significant preferences or disagreement among dogs |
| Flavors Natural and Artificial Licorice Flavor No. 1238 | 400 | No significant preferences or disagreement among dogs |
| Flavors Natural and Artificial Licorice Flavor No. 1238 | 1000 | No significant preferences or disagreement among dogs |

EXAMPLE II

A soft-moist dog food was prepared according to the teachings of Burgess et al U.S. Pat. No. 3,202,514 and having the following formulation:

| Ingredient | Parts |
| --- | --- |
| Beef tripe, trimmings and gullets | 34.0 |
| Soy grits | 32.0 |
| Sucrose | 16.5 |
| Propylene glycol | 6.0 |
| Corn syrup | 3.0 |
| Monocalcium phosphate | 2.0 |
| Dried whey | 0.5 |
| Iodized salt | 1.25 |
| Calcium carbonate | 1.0 |
| Soy bean hulls | 1.5 |
| Sodium carboyxmethylcellulose | 0.5 |
| Mono- and di- glycerides | 0.5 |
| Flavor, color, vitamin and mineral supplement | 0.055 |
| Potassium sorbate | 0.17 |
| Water | Sufficient for processing |

This control formulation was fed to dogs against the same dog food having ammoniated glycyrrhizin added thereto, varying only the level of sucrose in the test material by the replacement of wheat middlings for the sucrose. The results are summarized in Table II indicate that portions of the sucrose can be removed from the formulation and replaced with amounts of ammoniated glycyrrhizin.

TABLE II

| Level of Sucrose In Test Formulation (percent) | Level of Ammoniated Glycyrrhizin In Test Formulation (ppm) | Results |
|---|---|---|
| 16.3 | 25 | No difference to moderate loss for test versus control |
| 16.3 | 50 | Moderate loss for test versus control |
| 16.3 | 100 | Moderate win for test versus control |
| 16.3 | 200 | Moderate win for test versus control |
| 16.2 | 25 | Strong loss for test versus control |
| 16.2 | 50 | Strong loss for test versus control |
| 16.2 | 100 | Moderate win for test versus control |
| 16.2 | 200 | Strong win for test versus control |
| 15.8 | 25 | No difference |
| 15.8 | 50 | No difference to moderate win for test versus control |
| 15.8 | 200 | Moderate win for test versus control |
| 15.8 | 400 | Moderate win for test versus control |
| 15.5 | 25 | Moderate loss for test versus control |
| 15.5 | 50 | No difference to moderate loss for test versus control |
| 15.5 | 100 | No difference to moderate win for test versus control |
| 15.5 | 200 | No difference |
| 14.5 | 200 | No difference to moderate loss for test versus control |
| 14.5 | 400 | Moderate to strong loss for test versus control |

EXAMPLE III

In another set of comparisons, the control sugar level in the intermediate-moisture dog food was reduced from 16.5% to 14.9% by the replacement of formula for sucrose in the control formulations of Example II. The results are indicated in Table III.

TABLE III

| Level of Sucrose In Test Formulation (percent) | Level of Ammoniated Glycyrrhizin In Test Formuation (ppm) | Results |
|---|---|---|
| 13.9 | 25 | No difference |
| 13.9 | 50 | No difference |
| 13.9 | 100 | No difference |
| 13.9 | 200 | Moderate loss for test versus control |
| 12.9 | 25 | No difference |
| 12.9 | 50 | No difference |
| 12.9 | 100 | No difference to moderate loss for test versus control |
| 12.9 | 200 | Moderate loss for test versus control |

EXAMPLE IV

In another test using the dry, kibbled dog food employed in Example I, test samples of the food coated with 4% bleachable fancy tallow were fed against control samples. The design was a 3×3 factorial with the test samples having the following materials added internally during preparation:

| Ammoniated Glycyrrhizin (ppm) | Sucrose (percent) |
|---|---|
| 0 | 0 |
| 25 | 1 |
| 100 | 5 |

The samples were fed to twenty test panel dogs after hydration with one part water to one part dog food. Table IV shows average consumption differences over control for the levels of the main factors (ammoniated glycyrrhizin and sucrose) plus the interaction table.

TABLE IV

AVG. CONSUMPTION DIFFERENCES OVER CONTROL (g/Kg.-Dry) FOR MAIN FACTOR ANO THE INTERACTION

| Ammoniated Glycyrrhizin (ppm) | Sucrose |
|---|---|
| 0 = −.43 | 0% = −.78 |
| 25 = .88 | 1% = 1.60 |
| 100 = 3.78 | 5% = 3.40 |

| | | Sucrose | | |
|---|---|---|---|---|
| | | 0% | 1% | 5% |
| Ammoniated | 0 | −2.96 | −1.33 | 3.00 |
| Glycyrrhizin | 25 | −2.36 | 1.56 | 3.44 |
| (ppm) | 100 | 2.98 | 4.58 | 3.77 |

The above disclosure is for the purpose of enabling those skilled in the art to practice the present invention. However, upon reading this disclosure, many modifications and variations of the specific examples and explanations will become apparent to those skilled in the art. It is intended that all such modifications and variations be included within the scope of the invention which is defined by the following claims.

What is claimed is:

1. A process for improving the palatability of a dog food comprising incorporating into the dog food an amount of ammoniated glycyrrhizin which is effective to increase the palatability of a dog food, said amount depending on the sucrose content of the dog food and being in accordance with the following table:

| Sucrose (Wt. %) | Ammoniated Glycyrrhizin (PPM) |
|---|---|
| 21–25 | 100–400 |
| 16–21 | 100–300 |
| 13–16 | 25–250 |
| 10–13 | 25–175 |
| 8–10 | 25–150 |
| 6–8 | 25–100 |
| 4–6 | 25–75 |
| 2–4 | 25 |

2. A process according to claim 1 wherein the ammoniated glycyrrhizin is employed at a level of from about 50 to 200 parts per million.

3. A process according to claim 1 wherein the dog food is a dry dog food.

4. A process according to claim 3 wherein the ammoniated glycyrrhizin is incorporated internally into the dog food.

5. A process according to claim 1 wherein the dog food is an intermediate-moisture dog food.

6. A process according to claim 5 wherein the ammoniated glycyrrhizin is added to the ingredients of the pet food prior to final shaping.

7. An improved process for feeding dogs comprising the steps of:
(a) preparing a dog food;
(b) admixing with said dog good an amount of ammoniated glycyrrhizin which is effective to improve the palatability of the dog food, said amount depending on the sucrose content of the dog food and being in accordance with the following table:

| Sucrose (Wt. %) | Ammoniated Glycyrrhizin (PPM) |
|---|---|
| 21–25 | 100–400 |
| 16–21 | 100–300 |
| 13–16 | 25–250 |
| 10–13 | 25–175 |
| 8–10 | 25–150 |
| 6–8 | 25–100 |
| 4–6 | 25–75 |
| 2–4 | 25 | and
(c) feeding said dog food to dogs.

8. The product of the process of claim 1.

9. The product of the process of claim 4.

10. The product of the process of claim 6.

* * * * *